I. KILLIAN
Hay-Drag
No. 206,799.   Patented Aug. 6, 1878.
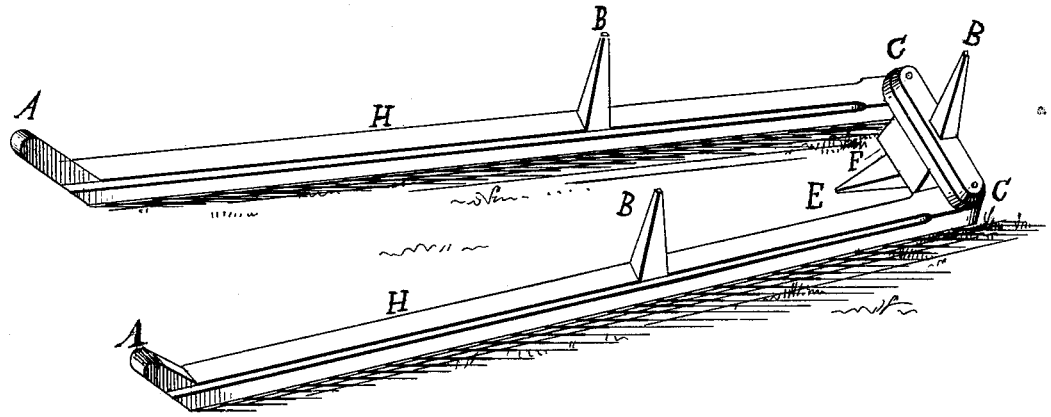
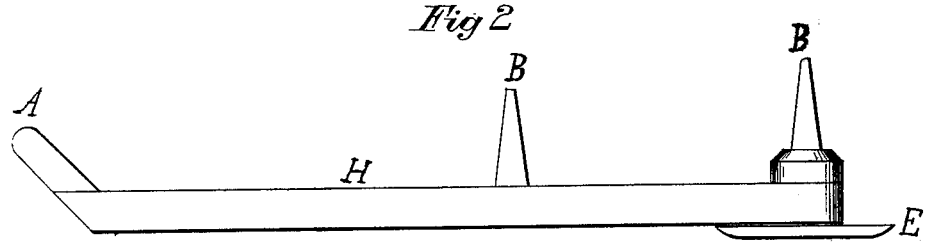
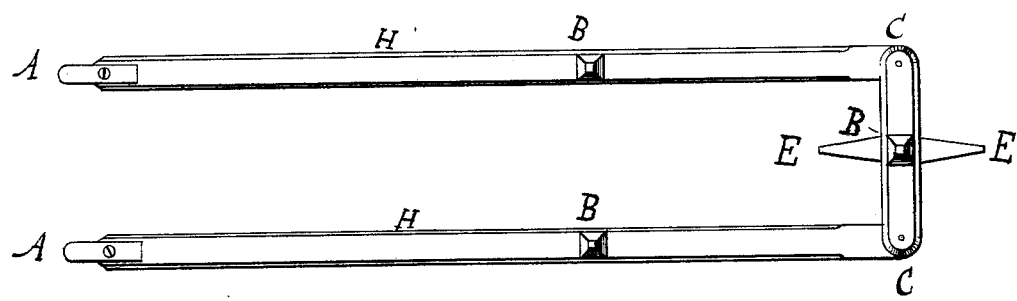
Attest:
Wylie B Killian
Wm H. Baker
Inventor:
Isaac Killian

UNITED STATES PATENT OFFICE.

ISAAC KILLIAN, OF WASHINGTON, INDIANA.

IMPROVEMENT IN HAY-DRAGS.

Specification forming part of Letters Patent No. 206,799, dated August 6, 1878; application filed March 1, 1878.

*To all whom it may concern:*

Be it known that I, ISAAC KILLIAN, of Washington, in the county of Daviess and State of Indiana, have invented a new and useful Machine for Dragging Hay from windrow to stack or barn, of which the following is a specification:

The invention relates to the construction of a machine for dragging hay from windrow in meadow to stack or barn.

Heretofore such removal of hay has been effected by means of grape-vine, chain, or rope being placed around the shock after the hay had been shocked.

The old method is objectionable, because the hay is required to be shocked before it can be dragged, and when shocked it must be allowed to stand sufficient time to allow it to settle, and thus expose it to the weather, and after being shocked it cannot be so readily handled with the fork.

The object of my invention is to provide a means of delivering hay in barn or at stack from meadow with as little labor as possible and in the best possible condition.

In the accompanying drawing, in which similar letters indicate like parts, Figure 1 is a perspective view of my machine complete. Fig. 2 is a single shaft of machine, with end view of connecting-section; and Fig. 3 is a bird's-eye view of the machine.

The main shafts H are constructed of oak boards twelve inches wide, two inches thick, and fourteen feet long. They are connected together by a board the same width and thickness, four feet long, which is bolted to the main shafts at C by means of iron bolts, with nut-screws on top, and which is sufficiently loose in main shafts to permit them to turn on the bolts with ease.

Beneath the cross-tie C is securely pinned a block, F, the same thickness of main shafts, and beneath and in the middle of the block F is tightly spiked a double-headed tooth, E, of oak or hickory. On the ends of the main shafts are securely bolted hitching-beams A. In the main shafts H, four feet from the cross-tie C and in the center of the cross-tie C, are erected standards B, two and one-half feet high.

The machine is operated by hitching a horse to each of the main shafts at A, then by placing a boy on each horse to drive horses not attached to each other, and drive on each side of a windrow of hay. The weight of the main shafts H keeps the machine close to the ground and under the hay, and the tooth E runs under the hay and drags it forward, and it fills up and is retained by the standards B until a load is secured, when it is driven to the stack. One horse is driven on each side of the stack until the hay is in the place wanted. Then the horses are turned in opposite directions from each other clear around until they come together again, when they are driven back for another load, thus reversing the machine, leaving the hay where wanted without the driver dismounting to unload; or, if desired, when the load is in the proper place, in barn or elsewhere, one horse can remain standing still and the other horse can be turned around until he reaches the stationary horse, thus successfully reversing the machine and leaving the load where wanted.

What I claim is—

The two main shafts H, connected by the cross-tie, and allowed to freely turn on the bolts C, so as to successfully reverse the machine, as described.

ISAAC KILLIAN.

Witnesses:
WYLIE B. KILLIAN,
WM. F. BAKER.